July 27, 1937.  J. D. COMSTOCK  2,088,319
CONTAINER
Original Filed Oct. 31, 1934

INVENTOR,
Jackson D. Comstock;
BY
ATTORNEYS.

Patented July 27, 1937

2,088,319

UNITED STATES PATENT OFFICE 2,088,319

CONTAINER

Jackson D. Comstock, Los Angeles, Calif.

Application October 31, 1934, Serial No. 750,802
Renewed January 15, 1937

2 Claims. (Cl. 53—1)

The present invention relates to containers, and particularly to a form of container adapted to hold a food product and to permit the food product to be sold in the said container.

An object of the invention is to provide a suitable container which may house a cooked food product, the container being suitably capped, to the end that the food product together with the container may be handled by a distributor, the food within the container being maintained in a sanitary and edible condition.

Another object is to provide a vendable food container so constructed and arranged that food contained therein may be directly heated while confined within said container, the food being maintained in a moist condition.

The invention contemplates the use of a container adapted to house a food product, the container being so constructed and arranged as to permit the same to hold water within the pores thereof, to the end that if the container is placed within an oven or over a flame or heater the food may be heated by steam.

The container provides a porous fire-proof receptacle, the pores of which may be filled with water prior to placing the container and any food content over an open flame or in an oven, the water turning to steam within the pores to furnish sufficient heat to the food product in the container. The water in the container, furthermore, serves to limit the temperature to which the food product is subjected, thus preventing burning of the food, insuring uniform warming of the food throughout its mass, and thus obviating the necessity for stirring the food. The attractiveness of the food may thereby be greatly enhanced as, for instance, with a covering or topping of baked cheese or browned bread crumbs.

An object of the invention is the provision of a vendable container which will have a high degree of absorption for water, with pores relatively small to the end that ready drainage of water therefrom is prevented.

Another object is the provision of a container which is resistant to thermal shock, such as may be occasioned by sudden changes of temperature.

Another object is the provision of a container which is devoid of all toxic or poisonous elements that might be dangerous to the health when the container is used as a receptacle for a food product.

A further purpose of the vendable porous container is to serve as a means of storing the food in a moist atmosphere prior to sale and consumption, the container being saturated with water when the food product is placed therein by the manufacturer.

A further object contemplates a container which is susceptible of manufacture in large quantities at low cost.

The invention forming the basis of this application will permit the manufacturers of food products to place pre-cooked food within a container, to suitably cap the container, and to deliver the pre-cooked food product to the point of distribution without the food becoming contaminated in the least. The consumer buys the container with its food product, and the said consumer may thereafter remove the cap so that access may be had to the food product. It will thus be seen that the contents, whatever it may be, is maintained in a sanitary condition.

To render the food product salable, it is necessary that the container be attractive in appearance and be low in cost of manufacture, as otherwise the expense for the food product might be too great to permit ready sale. Therefore, within the purview of my invention, I have provided a container which will not add but a fraction of a cent to the cost of the food.

With the above and other objects in view, the invention consists in the novel and useful provision, formation, construction, association, and relative arrangement of parts, members and features, all as disclosed in the specification and shown in the drawing, and specifically set forth in the claims.

Figure 1:
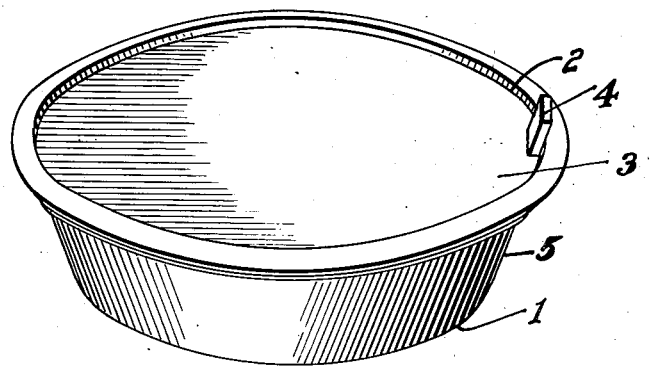
Figure 1 is a perspective view of the vendable food container.

Referring to the drawing, I designates the container which may be of any shape or form desired, and which container is annularly flanged at 2 to receive a cap or cover 3, the said cap or cover being in close fit engagement with the flange. This cover may be provided with one or more lugs 4 to permit the cover to be withdrawn from the flange of the container.

The container in the present instance has a sloping or inclined side wall 5 joined with the usual base 6.

Figure 2:
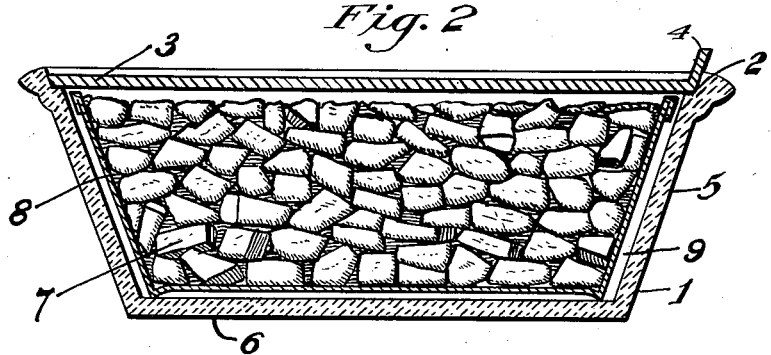
Figure 2 is a transverse vertical sectional view of a food container showing a pre-cooked food therein.

In the practice of the invention, I may provide a pre-cooked food product 7, within a parchmentized paper envelope or cup 8 adapted to loosely fit within the confines of the container. Such an arrangement is shown in Figure 2.

The container 1 is formed of ceramic material, such as clay characterized in that the clay has small pores, to the end that the container may be dipped in water, or the cover 3 may be removed and water placed within the space 9 included between the inner surface of the wall 5 and the outer surface of the envelope 8. It is a characteristic of the ceramic material that the water does not readily drain therefrom, and it is likewise a characteristic as pointed out by the objects, that the container may be subjected to thermal shock, such as might be occasioned when the container is directly placed over an open flame, causing a sudden change in temperature. When the container is placed over a flame, it being considered that the pores of the container are filled with water, the water will turn to steam and the food product 7 will be heated.

The character of the clay material forming the container 1 forms the subject matter of an application for patent of Thomas S. Curtis, filed October 23, 1934, for Ceramic composition and method of forming same, Serial No. 749,623, and this application is a specific application of the invention therein disclosed. Briefly stated, the composition is a single clay or a blend of clays admixed with certain percentages of finely ground scrap glass, such as that readily obtainable as cullet, or the broken scraps from bottle production. It is desirable that the clay or clays be relatively free from free quartz. The function of the finely ground glass is to act as a mild flux and to facilitate the hardening of the body at a low temperature and to likewise control the physical properties of the body in the act of manufacture. The ground glass provides a non-shrinking sharp aggregate which is cheap, free from erratic and high peaks of thermal expansion, and forms a valuable means of regulating the shrinkage of the final body. A valuable characteristic of the container is that there is no substantial change in its size or shape between dried size and fired size, thus permitting accurate predetermination of the container size to fit a given size manufactured cap. In forming the container, I use both a ball clay and plastic fire-clay, together with the glass aggregate. The container is formed from this material by casting or jiggering, or in any other approved manner. At the present time, it is contemplated that two thousand (2,000) containers may be manufactured per hour, the cost of the finished container being a fraction of a cent.

In order to make the container attractive, I prefer that the container be light peach in color, and this is accomplished by selecting clays relatively free of carbonaceous impurities.

The envelope 8 may, of course, be formed in any approved manner of parchmentized paper, or the equivalent. It is intended that the food product be placed within this parchmentized paper by the manufacturer or distributor, although within the purview of the invention, the food product may be placed directly within the container 1.

The operation, uses and advantages are as follows:

Figure 2 illustrates a food product, such as "hash". The space 9 between the container 1 and the parchmentized envelope 8 is charged with moisture-laden air, thus serving to maintain the food in a moist condition prior to reheating and consumption. The moisture-laden air is suitably effected by placing water to a given level between the parchmentized envelope and the container, or by directly dipping the container in water.

It has been found in actual practice that the edible food product is maintained in a salable condition for a considerable period of time after it has been packed and distributed.

I claim:

1. As a new article of manufacture, a cup-shaped outer container of porous material, a cup-shaped inner container of waterproof material, fitted within said outer container, and in which cooked food is placed, and a cover closing the open side of said outer container, said inner container being of such size as to provide a space between its side wall and the side wall of said outer container and a slight space between the upper edge of said inner container and said cover.

2. As a new article of manufacture, an outer ceramic container, an inner container of parchmentized material fitted within said outer container, a cover closing the outer side of said outer container, said inner container being of such size as to provide a space between its side wall and the side wall of said outer container, and a space between the upper edge of said inner container and said cover, through which space heated moisture-laden air may pass into the inner container and cooked food therein, when said outer container, after being saturated with water, is heated.

JACKSON D. COMSTOCK.